(12) United States Patent
Fanning et al.

(10) Patent No.: US 9,663,409 B2
(45) Date of Patent: May 30, 2017

(54) LIQUID PHOSPHITE FERTILIZER

(71) Applicant: THE ANDERSONS INC., Sycamore, OH (US)

(72) Inventors: Barry Fanning, Sycamore, OH (US); Rodney Gilliland, Sycamore, OH (US); Mollie Frankart, Sycamore, OH (US)

(73) Assignee: THE ANDERSONS INC., Sycamore, OH (US)

( * ) Notice: Subject to any disclaimer, the term of this patent is extended or adjusted under 35 U.S.C. 154(b) by 0 days.

(21) Appl. No.: 14/317,577

(22) Filed: Jun. 27, 2014

(65) Prior Publication Data

US 2015/0007626 A1     Jan. 8, 2015

Related U.S. Application Data

(60) Provisional application No. 61/842,892, filed on Jul. 3, 2013.

(51) Int. Cl.
| | |
|---|---|
| C05D 9/02 | (2006.01) |
| C05F 11/00 | (2006.01) |
| C05D 1/00 | (2006.01) |
| C05G 3/00 | (2006.01) |
| C05B 17/00 | (2006.01) |
| C05B 17/02 | (2006.01) |
| C05D 9/00 | (2006.01) |

(52) U.S. Cl.
CPC .............. *C05B 17/00* (2013.01); *C05B 17/02* (2013.01); *C05D 1/00* (2013.01); *C05F 11/00* (2013.01); *C05G 3/0064* (2013.01); *C05G 3/0076* (2013.01); *C05D 9/00* (2013.01)

(58) Field of Classification Search
None
See application file for complete search history.

(56) References Cited

U.S. PATENT DOCUMENTS

| | | | |
|---|---|---|---|
| 5,514,200 A | 5/1996 | Lovatt | |
| 5,800,837 A | 9/1998 | Taylor | |
| 5,830,255 A | 11/1998 | Lovatt | |
| 5,997,910 A | 12/1999 | Taylor | |
| 6,509,041 B2 | 1/2003 | Taylor | |
| 6,770,593 B1* | 8/2004 | Williams et al. | 504/101 |
| 6,824,584 B2 | 11/2004 | Young | |
| 7,708,799 B2 | 5/2010 | Grech et al. | |
| 7,887,616 B1 | 2/2011 | Fabry | |
| 8,088,191 B1 | 1/2012 | Fabry | |
| 8,092,569 B2 | 1/2012 | Grech | |
| 8,101,548 B2 | 1/2012 | Dean | |
| 8,193,119 B2 | 6/2012 | Fabry et al. | |
| 8,221,516 B1 | 7/2012 | Fabry | |
| 8,367,582 B2 | 2/2013 | Dean | |
| 8,685,133 B2* | 4/2014 | Ponder et al. | 71/27 |
| 2005/0268679 A1 | 12/2005 | Josef | |
| 2010/0010089 A1* | 1/2010 | Van Dyke et al. | 514/568 |
| 2012/0252708 A1* | 10/2012 | Van Lare | C11D 17/0039 507/241 |
| 2013/0012383 A1* | 1/2013 | Huffer | C05B 1/00 504/101 |
| 2013/0034613 A1 | 2/2013 | Kok et al. | |
| 2013/0210624 A1* | 8/2013 | Stringfellow et al. | 504/101 |
| 2016/0185681 A1* | 6/2016 | Fabry | C05G 3/02 504/101 |

* cited by examiner

*Primary Examiner* — Wayne Langel
(74) *Attorney, Agent, or Firm* — Avery N. Goldstein; Blue Filament Law PLLC

(57) ABSTRACT

A water soluble liquid fertilizer concentrate is provided that includes a bio-available phosphorus source, said phosphorus source consisting essentially of a phosphite salt. At least one of a bio-available nitrogen source and a bio-available potassium source are also provided. At least one micronutrient of calcium, magnesium, cobalt, iron, manganese, copper, boron, zinc, or molybdenum is present in the concentrate as an aqueous solute or soluble chelates. In some embodiments, the at least one phosphite salt is present at between 30 to 57 total weight percent dissolved in water and optionally contains a phosphate salt. A process of fertilizing a crop includes diluting the fertilizer concentrate with water to obtain a liquid fertilizer solution. The liquid fertilizer solution is then applied to the crop and after by allowing sufficient time, the fertilizer solution promotes growth of the crop.

20 Claims, No Drawings

LIQUID PHOSPHITE FERTILIZER

RELATED APPLICATIONS

This application is a non-provisional application that claims priority benefit to U.S. Provisional Application Ser. No. 61/842,892 filed Jul. 3, 2013; the contents of which are hereby incorporated by reference.

FIELD OF THE INVENTION

The present invention in general relates to fertilizer to promote plant growth, and in particular, to a liquid phosphite fertilizer that overcomes many of the problems associated with conventional phosphite fertilizers.

BACKGROUND OF THE INVENTION

Phosphite is a source of bio-available phosphorous that has been recognized to be more slowly metabolized by microorganisms and therefore limit the eutrophication associated with phosphate fertilizer runoff. Phosphite has also been identified as promoting the growth of beneficial soil, bacteria, and fungi.

Unfortunately, these benefits have not been fully realized due to either contamination of phosphite feed stocks with phosphates or intentional inclusion of phosphates purposefully included for fungicidal effect. Representative of these previous efforts are WO 00/076941; U.S. Pat. No. 5,514,200; U.S. Pat. No. 5,830,275; and US 2005/0268679; the contents of which are hereby incorporated by reference.

In addition to the limited beneficial affects associated with prior art formulations inclusive of phosphates, the conventional wisdom has been to develop a granular fertilizer inclusive of phosphite salts tend to be broadcast delivered as a solid or dissolved in water prior to soil application. However, storage of hygroscopic solids and the time associated with initial dissolution of such salts and the quantities commonly used in agriculture have both proven to be problematic.

Thus, there exists a need for a phosphite liquid fertilizer that achieves a superior improvement in plan growth and handling properties, as compared to conventional fertilizer formulations.

SUMMARY OF THE INVENTION

A water soluble liquid fertilizer concentrate is provided that includes a bio-available phosphorus source, said phosphorus source consisting essentially of a phosphite salt. At least one of a bio-available nitrogen source and a bio-available potassium source are also provided. At least one micronutrient of calcium, magnesium, cobalt, iron, manganese, copper, boron, zinc, or molybdenum is present in the concentrate as an aqueous solute or soluble chelates. In some embodiments, the at least one phosphite salt is present at between 30 to 57 total weight percent dissolved in water and optionally contains a phosphate salt.

A process of fertilizing a crop includes diluting the fertilizer concentrate with water to obtain a liquid fertilizer solution. The liquid fertilizer solution is then applied to the crop and after by allowing sufficient time, the fertilizer solution promotes growth of the crop.

DETAILED DESCRIPTION OF THE INVENTION

The present invention has utility as a fertilizer to promote plant growth based on water soluble phosphite salts. In contrast to the prior art it relied on phosphate in phosphite fertilizer formulations with the phosphate having fungicidal properties, the present invention is based on the discovery that through the promotion of the symbiotic effects between a target crop plant and beneficial soil bacteria and fungi, deleterious fungi are naturally inhibited thereby reducing the necessity of using phosphates and other fungicides known to cause environmental damage through eutrophication and other processes. In certain embodiments of the present invention, highly concentrated phosphite salt solution is provided that is stable against precipitation across a storage temperature range of −40° C. to 40° C. thereby facilitating efficient transport and ease of field delusion for application. An inventive composition is also readily formulated to include various micronutrients while still retaining liquid storage stability. Without intending to be owned by a particular theory, these micronutrients are believed to function as co-factors in various enzymatic systems of the target crop plant as well as soil organisms.

As used herein, "phosphite" is defined as inclusive of the anion $PO_3^{3-}$, a salt of $P(OH)_3$ with the related acid being referred to herein as phosphorous acid being synonymously denoted as $H_3PO_3$. The recognition that phosphorous acid in aqueous solution is almost exclusively diprotic with IUPAC nomenclature of phosphonic acid.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In certain inventive embodiments, a fertilizer is provided that has NPK over the range of 1-11:1-6:2-12 through the selection of ammonium and potassium containing cations for neutralized phosphate, respectively; with the proviso that at least one of bio-available nitrogen or potassium is present and therefore both N and K values in NPK are not both zero simultaneously. It is appreciated that phosphorous acid is neutralized with various bases either simultaneously or sequentially so as to form a liquid fertilizer containing a mixture of phosphite salts that not only include potassium ions such as the base KOH; the nitrogen source ammonia ($NH_4OH$ in aqueous solution), urea, and uric acid; but also with bases that do not contribute to the NPK value of the resultant fertilizer. Such non-NPK contributing bases operative herein illustratively include sodium hydroxide, sodium carbonate, sodium bicarbonate, sodium hydrogencarbonate, calcium oxide, calcium oxide hydrates (calcium hydroxide), magnesium oxide, calcium carbonates, magnesium oxide hydrates (magnesium hydroxide), magnesium carbonates, and combinations thereof, and partially neutralized compounds thereof.

As used herein, the bioavailable phosphorus, commonly denoted as "P" in NPK is intended to denote, the phosphite after having been converted to $P_2O_5$.

Inventive liquid phosphite fertilizer is readily formed by reacting phosphorous acid in aqueous solution in a mole ratio of cations to a molecule of phosphorous acid of between 0.5-3.3 cations per phosphorous acid molecule as a function of pH. In still other embodiments, the ratio of cations to phosphorous acid molecules is between 0.8 and 2.1.

The neutralization reaction between phosphorous acid is conducted at a temperature between about 10° C. and 140° C. with temperatures for reaction of between 15° C. and 100° C. being practical in several inventive embodiments.

The reaction is considered complete when a clear solution in water is formed. In order to facilitate efficient transport of an inventive liquid fertilizer, a fertilizer concentrate is formed that between 30 and 57 total weight percent of phosphite salts with water constituting about 40 to about 67 total weight percent of the liquid fertilizer concentrate. In order to reduce environmental damage associated with an inventive liquid fertilizer, in particular embodiments, the phosphorous acid feed stock is substantially free of +5 oxidation state phosphorous in the form of phosphoric and accordingly liquid phosphate based fertilizer is provided that is substantially free of phosphates. As used herein, "substantially free" in the context of phosphate concentration in an inventive liquid fertilizer or concentrate thereof has a ratio of phosphite:phosphate of greater than 10:1 on a molecular mole percentage basis and in some embodiments greater than 50:1 on a molecular mole ratio basis.

In some embodiments of the present invention, an inventive fertilizer concentrate is substantially free of carboxylates with an appreciation that higher phosphite concentrations result.

An inventive liquid fertilizer also includes at least one micronutrient trace metal dissolved in the liquid fertilizer in the form of a water soluble salt or a chelate thereof. Micronutrient trace metals known to function as co-enzymes or otherwise promote plant growth include calcium, magnesium, cobalt, iron, manganese, copper, chromium, boron, zinc, and molybdenum. Typically each micronutrient is present in the range from 0.00001-0.5; where total weight percentages are for the trace micronutrient cation itself and therefore excludes the weight contribution of chelating agents or anions or hydrates. The fulvic acid or salt thereof being present in 0 to 30 total weight percent. It is appreciated that the amount of micronutrient is readily titrated to adjust for specific soil conditions. Water soluble metal chelates of the micronutrients present in an inventive liquid fertilizer illustratively include ethylenediamine disuccinic acid (EDDS), ethylenediamine dimalonic acid (EDDM), and ethylenediamine diglutaric acid (EDDG), ethylenediaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenetetramine (Trien), triaminotriethylene amine, triethanolamine, malonic acid, succinic acid, glutaric acid, citric acid, fumaric acid, maleic acid, aconitic acid, hydroxyethylethylene diamine triacetic acid (HEDTA), or combinations thereof. It is appreciated that while EDTA represents a most commonly used chelating agent, the problems associated therewith as a bio-accumulant are obviated by using a biodegradable chelating agent such as EDDS or EDDG.

An organic additive that is particularly beneficial is fulvic acid or fulvate salts. The fulvic acid or salt thereof being present in 0 to 30 total weight percent.

An inventive liquid fertilizer formulation upon formulation is adjusted to a pH value as a concentrate of between 1.5 and 8 while in particular embodiments, the pH is adjusted to between 1.5 and 8.0. In certain embodiments, a liquid fertilizer also includes a pH buffering agent in an amount to stabilize fertilizer pH. pH buffering agents operative herein illustratively include citrates, acetates, humates, folates, fulvates, nitrates, sulfates, and combinations thereof.

The present invention is further detailed with respect to the following non-limiting examples. These examples are intended to illustrate specific embodiments of the present invention.

Example 1

156 grams of 70% phosphorous acid solution is blended with 124 grams of 90% KOH and 653 grams of water at a temperature at 80 C.-100° C. to form an aqueous phosphite fertilizer concentrate that is 25% by weight solids and having NPK values of 0-25-10. 67 grams of calcium chelate solution are added to the fertilizer concentrate and dissolved therein. The resulting solution is titrated to a pH of 6.0-7.5 with ammonia. The resulting fertilizer concentrate upon dissolution with water is then applied to a crop field a growth rate relative to a comparable NPK fertilizer based on phosphate with comparable fungal control and reduced phosphate runoff compared to the conventional phosphate applied test block.

Example 2

156 grams of 70% phosphorous acid solution is blended with 166 grams of 90% KOH and 611 grams of water at a temperature at 80° C.-100° C. to form an aqueous phosphite fertilizer concentrate that is 30% by weight solids and having NPK values of 0-25-12. 67 grams of calcium chelate solution are added to the fertilizer concentrate and dissolved therein. The resulting solution is titrated to a pH of 7.0-8.0 with ammonia. The resulting fertilizer concentrate upon dissolution with water is then applied to a crop field a growth rate relative to a comparable NPK fertilizer based on phosphate with comparable fungal control and reduced phosphate runoff compared to the conventional phosphate applied test block.

Example 3

The liquid fertilizer concentrate of Example 1 is produced with the further addition of 13 grams of iron chelate solution with comparable results to Example 1 and relative to conventional phosphate fertilizer.

Example 4

The liquid fertilizer concentrate of Example 1 is produced with the further addition of 67 grams of calcium, 1 gram of boron, 3 grams of manganese, 5 grams of zinc, and 10 grams of sodium fulvate with comparable results to Example 1 and relative to conventional phosphate fertilizer.

Example 5

The fertilizer concentrate of Example 1 is reproduced with the proviso that the quantity of ammonium hydroxide is increased to 127 grams with a comparable decrease in the amount of potassium hydroxide to result in a deliverable diluted fertilizer having NPK values of 4-25-0. Comparable results relative to a like NPK phosphate base fertilizer are obtained per Example 1.

The foregoing description is illustrative of particular embodiments of the invention, but is not meant to be a limitation upon the practice thereof. The following claims, including all equivalents thereof, are intended to define the scope of the invention.

The invention claimed is:

1. A water soluble liquid fertilizer concentrate consisting of:
   a bio-available phosphorus source, said phosphorus source consisting essentially of a phosphite salt that is a mixture of potassium phosphites and ammonium phosphites that provides a diluted fertilizer with an N-P-K value of 1-11:1-6:2-12;

at least one micronutrient selected from the group consisting of: calcium, magnesium, cobalt, iron, manganese, copper, boron, zinc, and molybdenum, said at least one micronutrient being present as an aqueous solute or soluble chelates;

water; and a pH buffering agent selected from the group consisting of: citrates, humates, folates, fulvates, nitrates, sulfates, and combinations thereof to yield a buffered pH of 1.5 to 8.0; and optionally a chelating agent selected from the group consisting of: ethylenediamine disuccinic acid (EDDS), ethylenediamine dimalonic acid (EDDM), ethylenediamine diglutaric acid (EDDG), ethylenediaminetetraacetic acid (EDTA), diethylenetriaminepentaacetic acid (DTPA), nitrilotriacetic acid (NTA), iminodiacetic acid (IDA), iminotriacetic acid (ITA), ethylenediamine (En), N,N'-diethylenediamine (Den), diethylenetriamine (DTN), diethylenetetramine (Trien), triaminotriethylene amine, hydroxyethylethylene diamine triacetic acid (HEDTA), malonic acid, succinic acid, glutaric acid, citric acid, fumaric acid, maleic acid, aconitic acid, and a combination thereof.

2. The concentrate of claim 1 wherein said phosphorus source is independent of phosphate.

3. The concentrate of claim 1 wherein said phosphorus source has a ratio of said phosphite salt to phosphate that is greater than 10:1.

4. The concentrate of claim 1 wherein the water constitutes from 40 to 67 total weight percent.

5. The concentrate of claim 1 wherein said at least one micronutrient includes calcium and iron.

6. The concentrate of claim 5 wherein said at least one micronutrient also includes magnesium and zinc.

7. The concentrate of claim 5 wherein said at least one micronutrient also includes boron.

8. A water soluble liquid fertilizer concentrate consisting essentially of:

phosphite salts that are a mixture of potassium phosphites and ammonium phosphites that provides a diluted fertilizer with an N-P-K value of 1-11:1-6:2-12 dissolved in water and optionally containing a phosphate salt; and at least one micronutrient selected from the group consisting of: calcium, magnesium, cobalt, iron, manganese, copper, boron, zinc, and molybdenum, said at least one micronutrient being present as an aqueous solute and soluble chelates; and a pH buffering agent selected from the group consisting of: citrates, humates, folates, fulvates, nitrates, sulfates, and combinations thereof to yield a buffered pH of 1.5 to 8.0.

9. The concentrate of claim 8 wherein said at least one phosphite salt is independent of said phosphate salt.

10. The concentrate of claim 8 wherein said at least one phosphite salt has a ratio of said phosphite salt to said phosphate salt that is greater than 10:1.

11. The concentrate of claim 8 wherein the water constitutes from 40 to 67 total weight percent.

12. The concentrate of claim 8 wherein said at least one micronutrient includes calcium and iron.

13. The concentrate of claim 12 wherein said at least one micronutrient also includes magnesium and zinc.

14. The concentrate of claim 13 wherein said at least one micronutrient also includes boron.

15. The concentrate of claim 1 wherein said buffering agent is humate.

16. The concentrate of claim 1 wherein said buffering agent is folate.

17. The concentrate of claim 1 wherein said buffering agent is fulvate.

18. The concentrate of claim 8 wherein said buffering agent is humate.

19. The concentrate of claim 8 wherein said buffering agent is folate.

20. The concentrate of claim 8 wherein said buffering agent is fulvate.

* * * * *